(12) United States Patent
Soh et al.

(10) Patent No.: US 6,895,251 B2
(45) Date of Patent: May 17, 2005

(54) METHOD FOR GENERATING MULTIMEDIA EVENTS USING SHORT MESSAGE SERVICE

(75) Inventors: Byeung Yun Soh, Anyang-shi (KR); Han Chang Suh, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 09/916,691

(22) Filed: Jul. 30, 2001

(65) Prior Publication Data

US 2002/0013154 A1 Jan. 31, 2002

(30) Foreign Application Priority Data

Jul. 31, 2000 (KR) .......................................... 2000-44416

(51) Int. Cl.[7] .................................................. H04Q 7/20
(52) U.S. Cl. ..................... 455/466; 455/412.1; 370/465
(58) Field of Search ............................ 455/466, 414.1, 455/412.1; 370/311, 465

(56) References Cited

U.S. PATENT DOCUMENTS

| | | | | |
|---|---|---|---|---|
| 5,617,538 A | * | 4/1997 | Heller ......................... | 709/245 |
| 5,806,000 A | * | 9/1998 | Vo et al. ...................... | 455/466 |
| 6,018,654 A | * | 1/2000 | Valentine et al. ......... | 455/414.4 |
| 6,097,949 A | * | 8/2000 | Jung et al. ................... | 455/466 |
| 6,201,974 B1 | * | 3/2001 | Lietsalmi et al. ........... | 455/466 |
| 6,223,045 B1 | * | 4/2001 | Valentine et al. ........... | 455/466 |
| 6,252,517 B1 | * | 6/2001 | Parvulescu et al. .......... | 340/7.2 |
| 6,330,436 B1 | * | 12/2001 | Zidel ........................ | 455/412.2 |
| 6,381,241 B1 | * | 4/2002 | Ghirnikar et al. ........... | 370/394 |
| 6,408,188 B1 | * | 6/2002 | Park ........................... | 455/466 |
| 6,690,931 B2 | * | 2/2004 | Heo ............................ | 455/466 |
| 6,694,136 B2 | * | 2/2004 | Uda ............................ | 370/328 |
| 6,718,168 B2 | * | 4/2004 | Ala-Luukko et al. ..... | 455/412.1 |
| 2001/0041578 A1 | * | 11/2001 | Na .............................. | 455/466 |
| 2002/0006784 A1 | * | 1/2002 | Kim ........................... | 455/412 |
| 2002/0069218 A1 | * | 6/2002 | Sull et al. ................ | 707/501.1 |
| 2002/0177454 A1 | * | 11/2002 | Karri et al. ................. | 455/466 |

* cited by examiner

*Primary Examiner*—Lester G. Kincaid
*Assistant Examiner*—Marcos L. Torres
(74) *Attorney, Agent, or Firm*—Fleshner & Kim, LLP

(57) ABSTRACT

A method for generating multimedia events such as images and/or sound in a mobile station uses a Short Message Service (SMS) or the like. According to a preferred embodiment of the present invention, a short message service center sends the data corresponding to the multimedia event selected by an originating mobile station only after the SMC makes sure that there is no data corresponding to the selected event in a receiving mobile station. A new teleservice, Multimedia Teleservice, is added to the SMS transport layer, and the User Data in the teleservice layer located under the transport layer now includes CHARi field or the like. The CHARi field performs control of the data transmission by supplying control fields including a multimedia event index and data fields in the user data.

29 Claims, 5 Drawing Sheets

METHOD FOR GENERATING MULTIMEDIA EVENTS USING SHORT MESSAGE SERVICE

BACKGROUND OF THE INVENTION

1. Field of the Invention

The present invention relates to an advanced mobile communication system, and more particularly, to a method for generating multimedia events.

2. Background of the Related Art

Generally, a Short Message Service (SMS) provides for the transfer of short messages between an application residing on a Mobile Station (MS) and an application within the network. A Short Message Service Center (hereafter, "SMC") and base stations (BS) provide a conduit for short messages between the application in the network and the application in the MS. The technologies related to the short message services (SMS) and the transmissions of the short messages in a wireless communication are based on the SMS-related standards, IS-637 and IS-95/J-STD-008, respectively, whose entire disclosure are hereby incorporated by reference.

In a related art SMS, a SMC initially provides short messages to a BS via a core network, and the BS then sends those short messages to a mobile station on a paging channel, which is also a control channel. When the short messages are provided by the SMC, a destination address and other service information are also provided together with the messages, and the mobile station can receive the short messages in an idle state.

In transmitting technology of multimedia data such as sound and images, a simple image service (SIS) is used when adding a picture or animation images to the short message. When a short message is transmitted, the attached image files are also transmitted at the same time.

The method for generating multimedia events based on the related art will now be described. FIG. 1 illustrates a related art short message transmission system. The system includes mobile stations (MS) (1) that input text/voice messages and transmit, a short message service center (SMC) (4) that stores and transmits the messages received from the mobile stations (1), base stations (BS) (2) that function as an interface enabling the SMC to store and transmit the messages, and a home location register (HLR) (3) that stores the information by mobile stations. The BS-MS interface forms a route for short message (SM) transmissions between the mobile stations (MS) and the SMC, and the HLR-SMC interface is used to get the status information of the receiving mobile stations.

FIG. 2 illustrates sub-parameters of a SMS transport layer used for generating multimedia events according to the related art. The SMS is divided into a number of protocol layers: (1) the SMS teleservice layer, (2) the SMS transport layer, and (3) the SMS relay layer. The teleservice layer and transport layer are two upper layers used in the SMS, and the sub-parameters of each layer are illustrated in the FIG. 2. The transport layer provides information such as an originating address to enable the lower layer to send the messages properly, and the sub-parameters of the teleservice layer are stored in the Bearer Data field of the transport layer as shown in FIG. 2.

The sub-parameters of the teleservice layer are different depending on whether the teleservice layer transmission is sending or receiving the messages. In other words, the teleservice layer includes sub-parameters such as Submit Message when sending and Deliver Message when receiving. However, a User Data sub-parameter is always used to send the user's final data no matter whether the teleservice layer is sending or receiving the messages. Image data compressed by the SIS are stored and sent through the User Data sub-parameter.

As described above, the related art short message transmission system and SMS have various disadvantages. Because large files such as sound or image files are attached to every short message subjected to be transmitted when transmitting multimedia events according to the related art, a large portion of the channel capacity is not used or wasted. Therefore, when the size of the file is too large, the file has to be divided into several pieces with appropriate smaller sizes so that each of the several pieces can be stored in the User Data and the message must be transmitted several times. Otherwise, the size of the file subjected to be transmitted at one time must be limited for a multimedia event.

The above references are incorporated by reference herein where appropriate for appropriate teachings of additional or alternative details, features and/or technical background.

SUMMARY OF THE INVENTION

An object of the invention is to substantially solve one or more of the above problems and/or disadvantages in a whole or in part and to provide at least the advantages described hereinafter.

Another object of the present invention is to provide a method for generating multimedia events for a mobile communication system.

Another object of the present invention is to provide a method for generating multimedia events for a communication system using a short message service.

Another object of the present invention is to provide a method for operating a mobile communication system that generates multimedia events including images and sounds in a receiving mobile station using a short message service.

Another object of the present invention is to provide a method for generating multimedia events by using the short message service in which a new teleservice option is added in the teleservice ID of the SMS transport layer.

In order to achieve at least the above objects in a whole or in part and in accordance with the purposes of the invention, as embodied and broadly described, a method for generating multimedia events by using the SMS in a mobile communication system is provided that includes selecting a multimedia event subjected to be transmitted to a receiving mobile station by an originating mobile station, transmitting an index corresponding to the selected event and an identification number of the receiving mobile station from the originating mobile station to a short message service center (SMC), checking whether the receiving mobile station already contains data corresponding to the selected event by the short message service center (SMC) using a database accessed by the SMC, and transmitting only the index corresponding to the selected event from the short message service center (SMC) to the receiving mobile station if the receiving mobile station already contains the data.

In order to achieve at least the above objects in a whole or in part and in accordance with the purposes of the invention, as embodied and broadly described, a method of generating multimedia events using a short message service in a mobile communication system, including receiving an index corresponding to a multimedia event selected by an originating mobile station and an identification number of a receiving mobile station from the originating mobile station, checking whether the receiving mobile station already contains data corresponding to the index using a short message service center, and transmitting the index to the receiving mobile station if the receiving mobile station already contains the data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
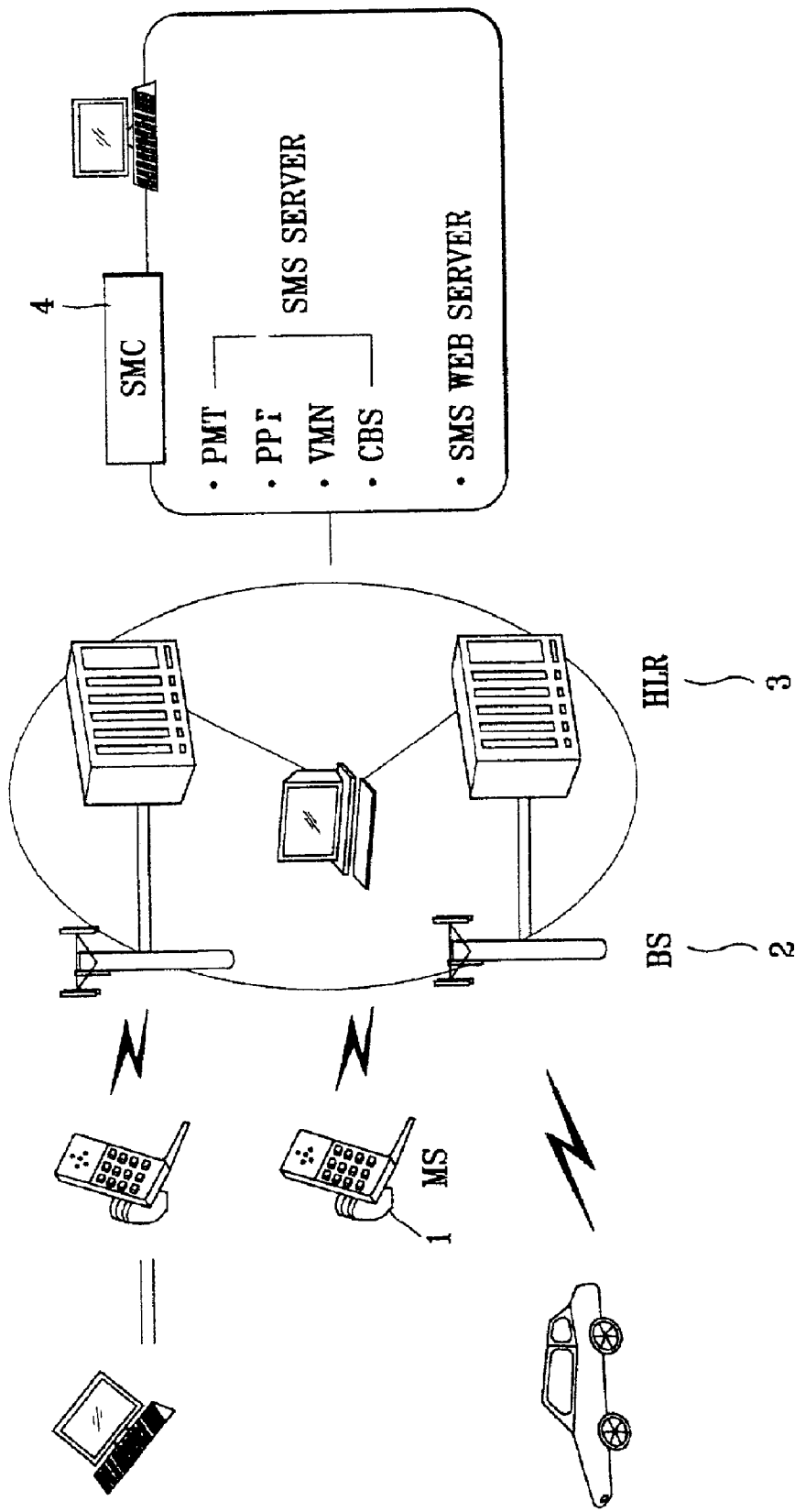
FIG. 1 illustrates a related art short message transmission system.
Figure 2:
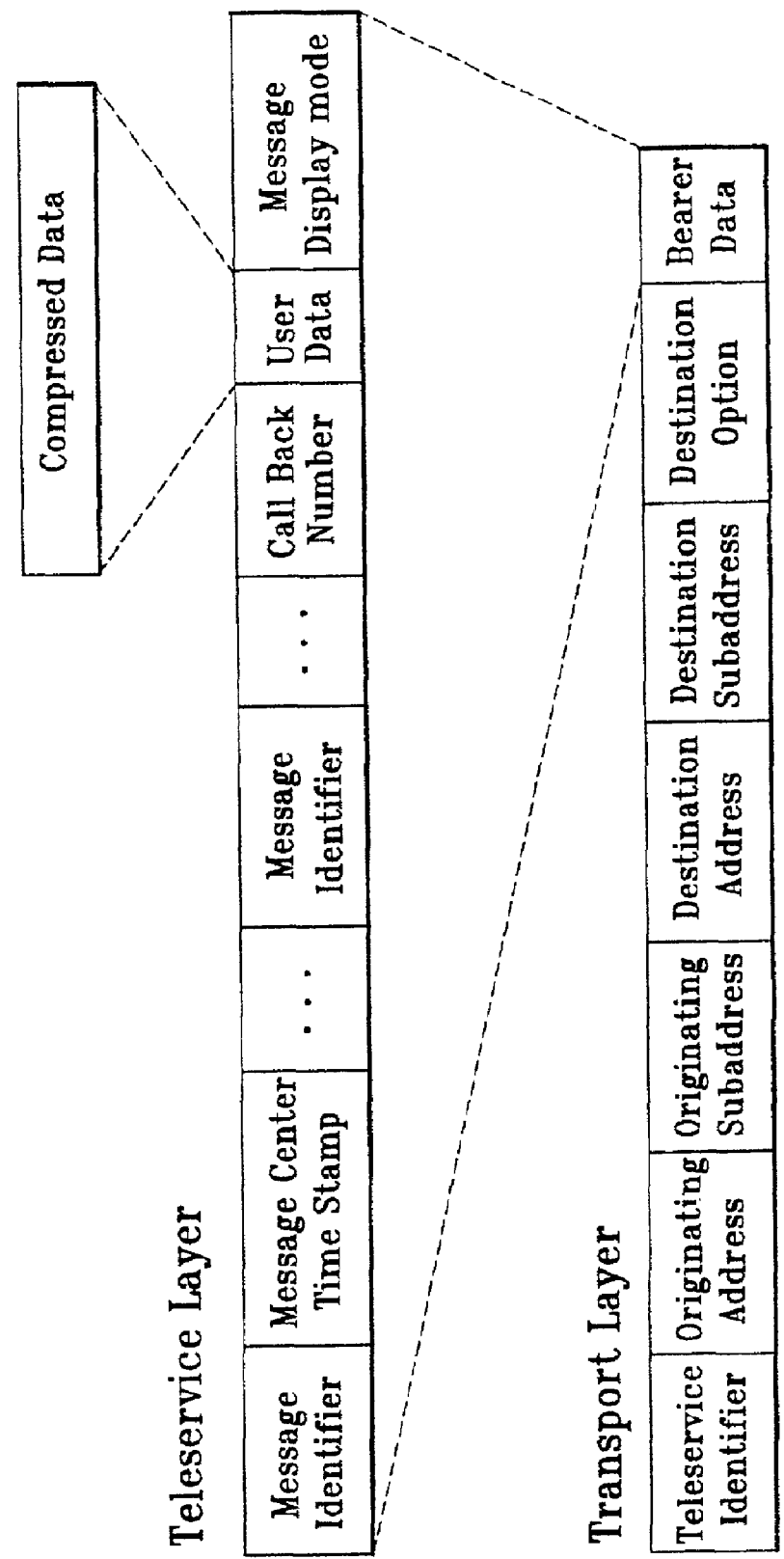
FIG. 2 illustrates sub-parameters of a SMS transport layer used for generating multimedia events according to the related art.
Figure 3:
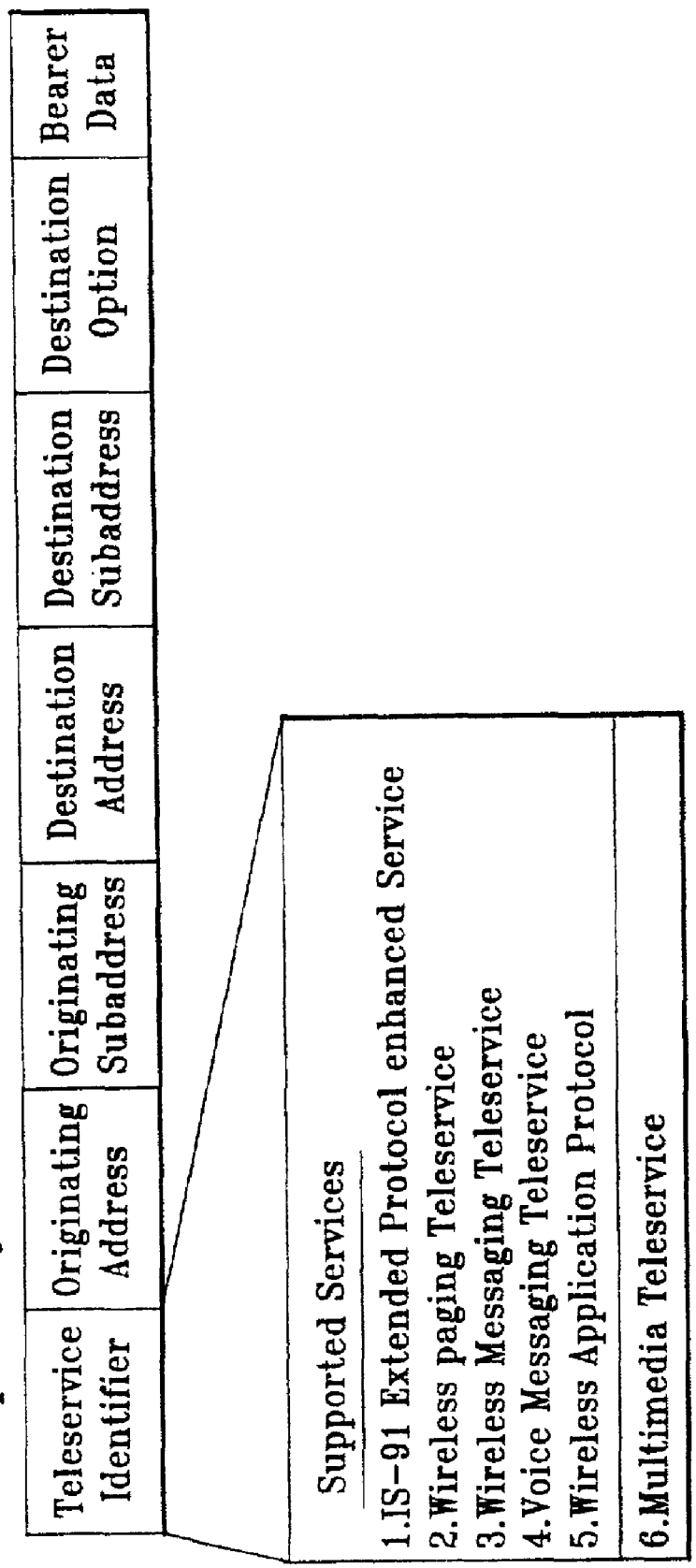
FIG. 3 is a diagram that illustrates a preferred embodiment of parameters of a SMS transport layer used for generating multimedia events according to the present invention.

FIG. 3 is a diagram that illustrates a preferred embodiment of subparameters of a SMS transport layer used for generating multimedia events according to the present invention that can be used, for example, in a mobile communication system. As shown in FIG. 3, a new teleservice ID is preferably added to a Teleservice Identifier subparameter of the SMS transport layer. Five teleservices are currently supported by TIA/EIA-41-D including: (1) IS-91 Extended Protocol Enhanced Service, (2) Wireless Paging Teleservice, (3) Wireless Messaging Teleservice, (4) Voice Mail Notification or Voice Messaging Teleservice, and (5) Wireless Application Protocol. The entire disclosure of the TIA/EIA-41-D is hereby incorporated by reference. The preferred embodiment of the present invention shown in FIG. 3 adds a new teleservice called Multimedia Teleservice to the supported services in the Teleservice Identifier subparameter. The title of the additional service, "Multimedia Teleservice" indicates that the contents of the SMS are related to the multimedia events or their corresponding data, and the multimedia events or the corresponding data are preferably retained in the SMC. The SMC preferably assigns a serial number to every multimedia event and shares the serial number information with all other mobile stations. In addition, each mobile station preferably stores a given amount of the multimedia data in cache-memory or the like, and a database regarding to the index of the stored multimedia data is retained in the SMC.

Figure 4:
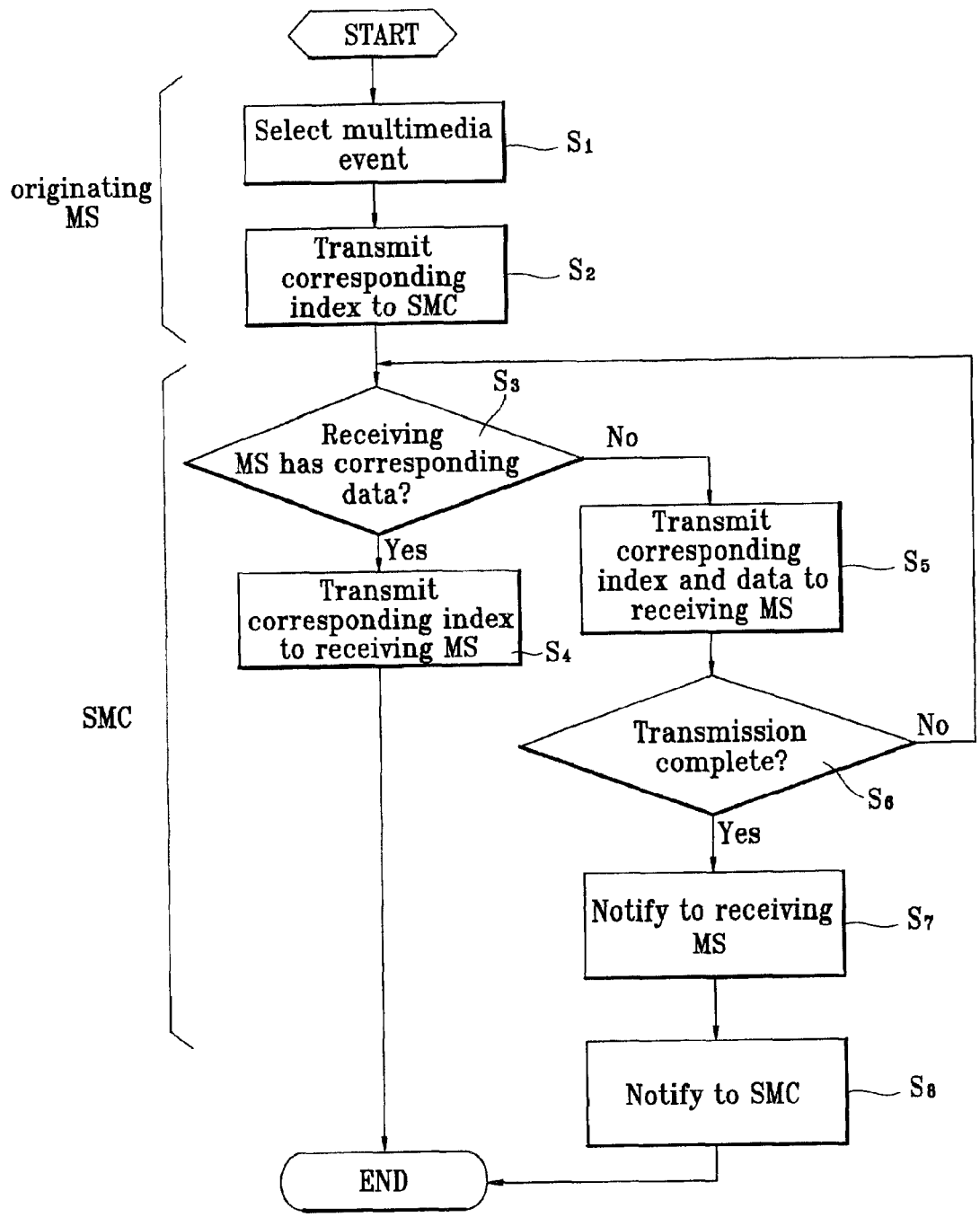
FIG. 4 is a flow chart that illustrates a preferred embodiment of a method for generating multimedia events using SMS according to the present invention.

FIG. 4 is a flow chart that shows a preferred embodiment of a method for generating the multimedia events using the SMS according to the present invention. After a process begins, an originating mobile station selects a multimedia event to be subjected to transmission to a receiving mobile station (S1). Then, an index corresponding to the selected event and an identification number of the receiving mobile station are transmitted from the originating MS to the short message service center (SMC) (S2). The SMC checks whether the receiving mobile station already contains the data corresponding to the selected multimedia event preferably by using a database stored inside of the SMC (S3).

If the SMC determines the receiving MS has the data corresponding to the selected multimedia event, the SMC sends only the index of the selected multimedia event to the receiving mobile station (S4). Otherwise, both of the index and data corresponding to the selected multimedia event are preferably sent to the receiving mobile station by using the SMS (S5). Thereafter, the SMC determines whether the SMS transmission of the data is completed (S6). If it is determined by the SMC that the data transmissions are successfully completed in step S6, the SMC preferably indicates in the receiving mobile station that the corresponding data has been transmitted (S7) and also indicates in the SMC that the receiving mobile station now contains the data corresponding to the index (S8). However, if it is determined by the SMC that the transmission is not completed in step S6, steps S3 to S8 are preferably repeated again. After transmission of the index to the receiving MS (S4) or after the notification in the SMC the receiving MS has received at least the data corresponding to the selected multimedia event (S8), the method preferably ends or another multimedia event can be processed.

Figure 5:
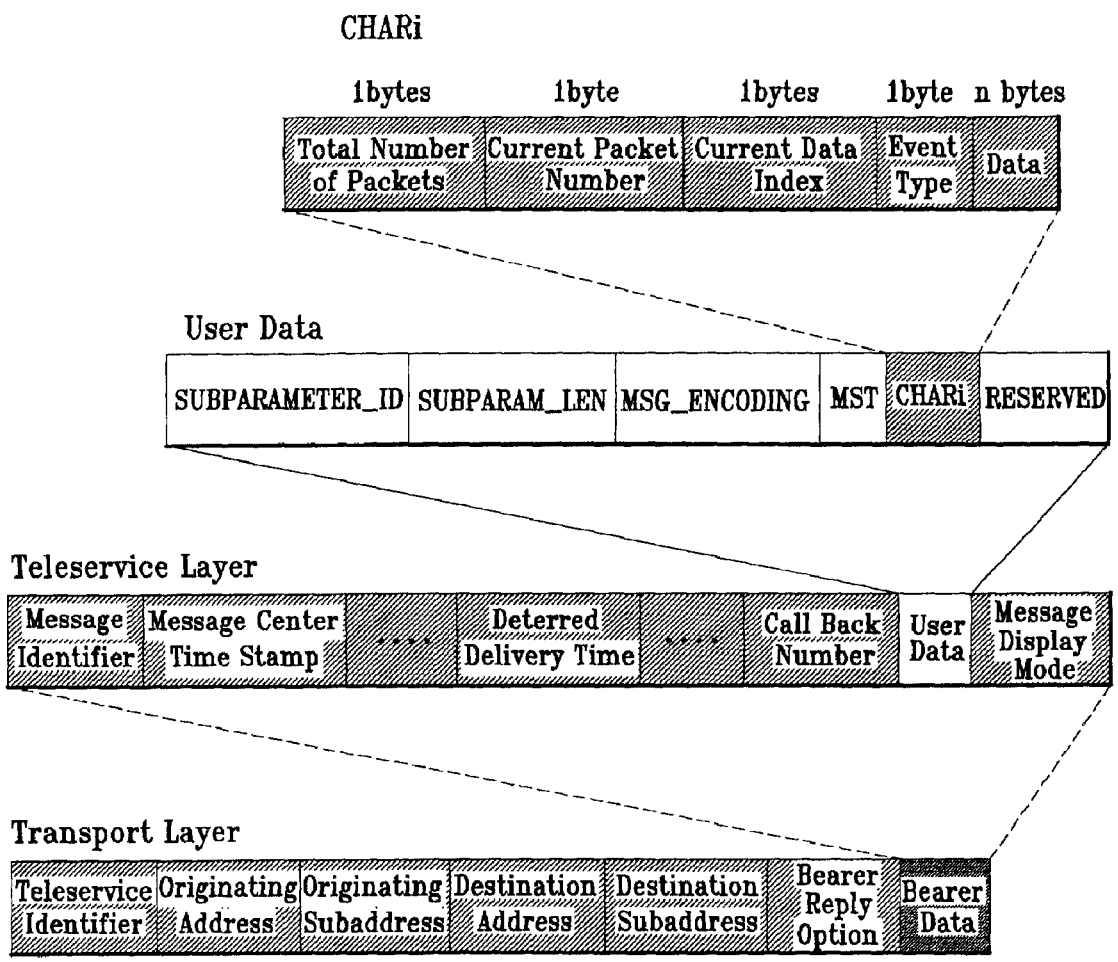
FIG. 5 is a diagram that illustrates parameters of a SMS transport layer used for generating multimedia events according to a preferred embodiment of the present invention.

FIG. 5 is a diagram that illustrates a preferred embodiment of sub-parameters of a SMS transport layer used for generating multimedia events according to the present invention. As shown in the detailed sub-parameters of the SMS transport layer of FIG. 5, the delivery of the index and data of a multimedia event is preferably achieved in the User Data field of the teleservice layer. Customization is necessary in order to use the sub-parameters of the "User Data" according to the preferred embodiment of FIG. 5: a first byte of a CHARi field represents a total number of the packets required to send the event data, a second byte represents the number of the current packet, a third byte represents a current data index, a fourth byte represents a type of the event (e.g., picture/animation images, sound, or voice), and the fifth and higher (5, 6, 7, ...) bytes are for the actual data corresponding to the selected multimedia event. However, the present invention is not intended to be so limited for example, the control and data positions could be modified or other control data could be used.

When the originating mobile station sends the multimedia event to the SMC, preferably the Current Data Index of the CHARi field is set to the index of the event to be subjected to be transmitted, and others (e.g., Total Number of Packets, Current Packet Number, Event Type, and Data) are set to 0x00. Thus, there is no data set for Data in the CHARi field yet. Subsequently, the message is sent to the SMC after the Teleservice Identifier in the transport layer is set to Multimedia Teleservice.

On the other hand, when the multimedia event is sent to the receiving mobile station from the SMC, the SMC preferably checks whether the receiving mobile station already contains the data corresponding to the index using the database in the SMS. If it does, the SMC preferably sends the SMS Deliver Message to the receiving mobile station after copying User Data in SMS Submit Message to User Data in Deliver Message. Otherwise, the event data is divided and transmitted to the mobile station in the Data field in the CHARi.

As described above, preferred embodiment of a method and an apparatus for generating multimedia events using a short message service in a communication system have various advantages. According to preferred embodiments of the present invention a transmission occurs in a mobile communication system only when there is corresponding data to be subjected to transmission to the receiving mobile station, so the channel capacity can be enhanced, and the transmitting time can be reduced. Further, preferred embodiments according to the present invention can be accomplished by a minor modifications such as a modification of the current software, without any conflicts with the SMS. Methods for generating multimedia events according to the preferred embodiments can be applied not only to images, but also sound, voice, and many others so that the transmission efficiency (e.g., transmission speed and capacity are increased or transmission time can be reduced) of data using indexing and cacheing can be enhanced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of generating multimedia events using a short message service in a mobile communication system, comprising:
   receiving an index corresponding to a multimedia event selected by an originating mobile station and an identification number of a receiving mobile station from said originating mobile station;
   checking whether said receiving mobile station already contains data indexed by said index using the short message service center; and
   transmitting said index without transmitting said data to said receiving mobile station if said receiving mobile station already contains said data.

2. The method of claim 1, further comprising transmitting both of said index and said data to said receiving mobile station if said receiving mobile station does not contain said data.

3. The method of claim 2, further comprising indicating in said receiving mobile station that said data are transmitted when said data transmission is completed.

4. The method of claim 2, further comprising indicating at said short message service center that said receiving mobile station now contains said data indexed by said index when said data transmission is completed.

5. The method of claim 1, wherein said short message service center contains a data pool related to every multimedia event including a corresponding data and index for said every multimedia event, and said short message service center shares information in said data pool with other mobile stations.

6. The method of claim 1, wherein a database at said short message service center includes each corresponding data and index for a plurality of multimedia events, and said short message service center shares information in said database with other mobile stations.

7. The method of claim 1, wherein Multimedia Teleservice is added as a new teleservice option to a transport layer of said short message service.

8. The method of claim 7, wherein a designated User Data sub-parameter of a teleservice layer located under said transport layer of said short message service includes a prescribed field that includes a first byte representing a total number of packets required to send said data corresponding to said selected multimedia event, a second byte representing a number of a current packet, a third byte representing a current data index, a fourth byte representing a type of said multimedia event and fifth and higher bytes storing said data.

9. The method of claim 8, wherein the multimedia type is one of image and sound, and wherein the prescribed field is a CHARi field.

10. The method of claim 8, wherein the User Data sub-parameter is transmitted with only the third byte being non-zero.

11. The method of claim 7, wherein a designated sub-parameter of a teleservice layer located under said transport layer of said short message service includes a total number of packets needed to send said data, a number of a current packet, a current data index and at least some of said data.

12. A method for generating multimedia events using a short message service in a mobile communication system comprising:
    selecting a multimedia event subjected to be transmitted to a receiving mobile station by an originating mobile station;
    transmitting an index indexing the selected multimedia event and an identification number of the receiving mobile station from the originating mobile station to the short message service center (SMC);
    determining whether the receiving mobile station contains data corresponding to the selected event by the short message service center (SMC) using the index and a database of the short message service center (SMC); and
    transmitting only the index corresponding to the selected multimedia event from the short message service center (SMC) to the receiving mobile station if the receiving mobile station already contains the data.

13. The method of claim 12, further comprising transmitting both of said index and said data to said receiving mobile station when said receiving mobile station does not contain said data.

14. The method of claim 12, wherein said database of said short message service center (SMC) includes each corresponding data and index for a plurality of multimedia events, and said short message service center (SMC) shares information in said database with other mobile stations.

15. The method of claim 12, wherein a Multimedia Teleservice is added as a new teleservice option to a transport layer of said short message service.

16. The method of claim 15, wherein a designated User Data sub-parameter of a teleservice layer located under said transport layer of said short message service includes a prescribed field that includes a first byte representing a total number of packets required to send said data corresponding to said selected multimedia event, a second byte representing the number of a current packet, a third byte representing a current data index, a fourth byte representing a type of said multimedia event and fifth and higher bytes storing said data.

17. The method of claim 16, wherein the designated User Data sub-parameter is transmitted with only the third byte being no-zero.

18. A method of generating multimedia events using a short message service in a mobile communication system, comprising:

receiving an index corresponding to a multimedia event selected by an originating mobile station and an identification number of a receiving mobile station from said originating mobile station;

checking whether said receiving mobile station already contains data corresponding to said index using the short message service center; and transmitting said index to said receiving mobile station if said receiving mobile station already contains said data, wherein said short message service center contains a data pool related to every multimedia event including a corresponding data and index for said every multimedia event, and said short message service center shares information in said data pool with other mobile stations.

19. A method of generating multimedia events using a short message service in a mobile communication system, comprising:

receiving an index corresponding to a multimedia event selected by an originating mobile station and an identification number of a receiving mobile station from said originating mobile station;

checking whether said receiving mobile station already contains data corresponding to said index using the short message service center; and transmitting said index to said receiving mobile station if said receiving mobile station already contains said data, wherein a database at said short message service center includes each corresponding data and index for a plurality of multimedia events, and said short message service center shares information in said database with other mobile stations.

20. A method of generating multimedia events using a short message service in a mobile communication system, comprising:

receiving an index corresponding to a multimedia event selected by an originating mobile station and an identification number of a receiving mobile station from said originating mobile station;

checking whether said receiving mobile station already contains data corresponding to said index using the short message service center; and transmitting said index to said receiving mobile station if said receiving mobile station already contains said data, wherein Multimedia Teleservice is added as a new teleservice option to a transport layer of said short message service, and wherein a designated User Data sub-parameter of a teleservice layer located under said transport layer of said short message service includes a prescribed field that includes a first byte representing a total number of packets required to send said data corresponding to said selected multimedia event, a second byte representing a number of a current packet, a third byte representing a current data index, a fourth byte representing a type of said multimedia event and fifth and higher bytes storing said data.

21. The method of claim 20, wherein the multimedia type is one of image and sound, and wherein the prescribed field is a CHARi field.

22. The method of claim 20, wherein the User Data sub-parameter is transmitted with only the third byte being non-zero.

23. A method of generating multimedia events using a short message service in a mobile communication system, comprising:

receiving an index corresponding to a multimedia event selected by an originating mobile station and an identification number of a receiving mobile station from said originating mobile station;

checking whether said receiving mobile station already contains data corresponding to said index using the short message service center; and transmitting said index to said receiving mobile station if said receiving mobile station already contains said data, wherein Multimedia Teleservice is added as a new teleservice option to a transport layer of said short message service, and wherein a designated sub-parameter of a teleservice layer located under said transport layer of said short message service includes a total number of packets needed to send said data, a number of a current packet, a current data index and at least some of said data.

24. A mobile terminal including a short message service, comprising:

a receiver configured to receive only an index corresponding to a selected multimedia event if the mobile station already contains data corresponding to the selected multimedia event, wherein the index is read from a Multimedia Teleservice field added as a new teleservice option to a transport layer of said short message service, and wherein a designated User Data sub-parameter of a teleservice layer located under said transport layer of said short message service includes a prescribed field that includes a first byte representing a total number of packets required to send said data corresponding to said selected multimedia event, a second byte representing a number of a current packet, a third byte representing a current data index, a fourth byte representing a type of said multimedia event and fifth and higher bytes storing said data.

25. The mobile terminal of claim 24, further comprising: information about a data pool in a short message service center related to every multimedia event including a corresponding data and index for said every multimedia event.

26. The mobile terminal of claim 24, further comprising: information about a database at a short message service center including each corresponding data and index for a plurality of multimedia events.

27. A mobile terminal including a short message service, comprising:

a transmitter configured to transmit only an index corresponding to a selected multimedia event if a receiving mobile station already contains data corresponding to the selected multimedia event, wherein the index is written into a Multimedia Teleservice field added as a new teleservice option to a transport layer of said short message service, and wherein a designated User Data sub-parameter of a teleservice layer located under said transport layer of said short message service includes a prescribed field that includes a first byte representing a total number of packets required to send said data corresponding to said selected multimedia event, a second byte representing a number of a current packet, a third byte representing a current data index, a fourth byte representing a type of said multimedia event and fifth and higher bytes storing said data.

28. The mobile terminal of claim 27, further comprising:

information about a data pool in a short message service center related to every multimedia event including a corresponding data and index for said every multimedia event.

29. The mobile terminal of claim 27, further comprising:

information about a database at a short message service center including each corresponding data and index for a plurality of multimedia events.

* * * * *